Jan. 17, 1928.  
J. D. MERRIFIELD  
1,656,598  
MACHINE FOR FORMING SCREW THREAD CUTTING TAPS  
Original Filed Feb. 23, 1923    2 Sheets-Sheet 1
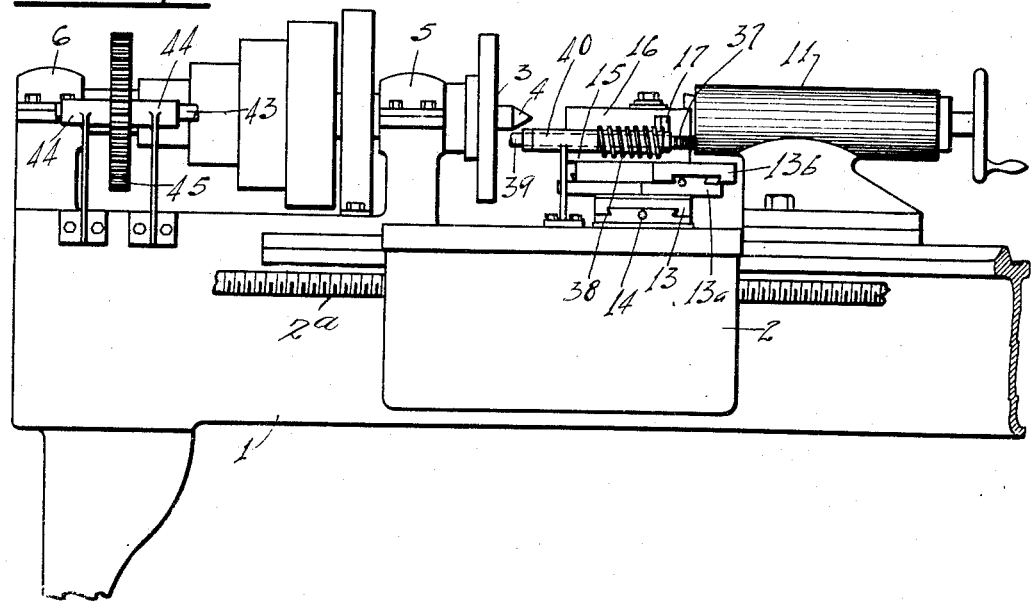
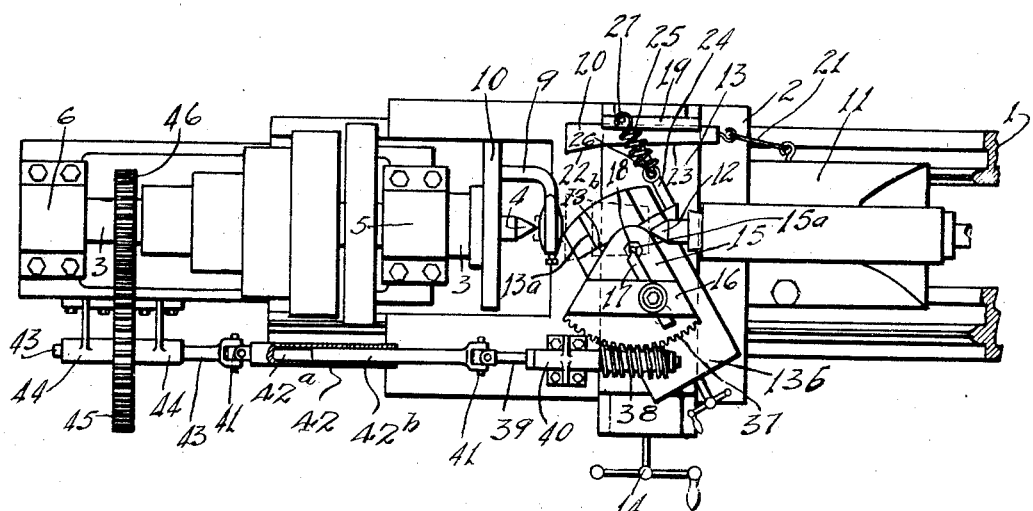
Inventor  
John D. Merrifield  
by  
Attorney Jan. 17, 1928.
J. D. MERRIFIELD
1,656,598
MACHINE FOR FORMING SCREW THREAD CUTTING TAPS
Original Filed Feb. 23, 1923  2 Sheets-Sheet 2
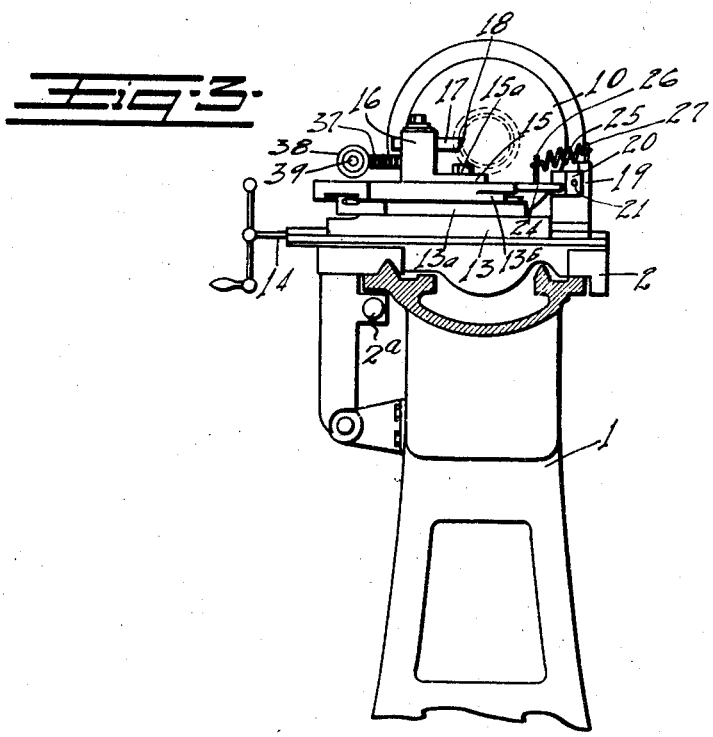
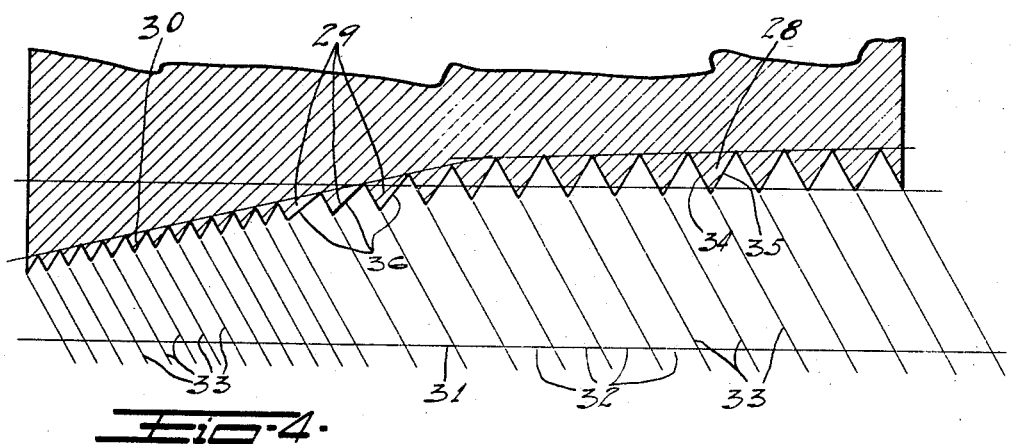
Inventor
John D. Merrifield
by his Attorney Patented Jan. 17, 1928.

1,656,598

UNITED STATES PATENT OFFICE.

JOHN D. MERRIFIELD, OF ERIE, PENNSYLVANIA, ASSIGNOR TO REED MANUFACTURING COMPANY, OF ERIE, PENNSYLVANIA, A CORPORATION OF PENNSYLVANIA.

MACHINE FOR FORMING SCREW-THREAD-CUTTING TAPS.

Application filed February 23, 1923, Serial No. 620,649. Renewed February 10, 1927.

This invention is designed to facilitate the cutting of screw threads in forming taps and particularly taps having other than a straight-line formation, such as variations of taper. In carrying out my invention I utilize an ordinary lathe with a taper attachment, the taper conforming to the taper of the tap to be cut. I mount the tool on a support with a sliding mounting sliding in line with the slopes of the teeth to be cut and have this sliding mounting controlled by the taper attachment. In this way the teeth are correctly formed and justified on all tapers. In addition to this I prefer to arrange to swing the cutting tool so that the inclination of the slopes of some of the threads may be varied for improving the tap. Other features and details of the invention will appear from the specification and claims.

The invention is illustrated in the accompanying drawings as follows:—

Fig. 1 shows a front elevation of the machine.

Fig. 2 a plan view of the machine.

Fig. 3 an end elevation of the machine.

Fig. 4 a diagrammatic view indicating the cutting action of the machine on the tap.

1 marks the base of the machine, 2 a tool carriage of the machine, 2ª a lead screw driven in the usual manner by a drive connection (not shown), and 3 the head spindle having the usual center 4. The spindle is journaled in bearings 5 and 6 on the frame. A tap blank is centered on the spindle center 4 and is driven by a dog 9 engaging the face plates 10. A tail center 12 is carried by the tail stock 11 and operates in the usual manner. The tool support is slidingly mounted on a cross feed slide 13, this slide being governed by a screw 14. While this slide is shown as operating directly across the machine so as to utilize the ordinary standard machine it will be understood that this slide may operate at an inclination and in some ways an inclination of this slide would be preferable. Arranged on the cross feed slide 13 is a compound slide 13ª in which a tool post mounting 13ᵇ slides. A tool post base 15 is pivotally mounted by means of a stud 15ª on the tool post mounting 13ᵇ. A tool support 16 extends from the base 15 and a tool 17 is secured in this support, the cutting point 18 of the tool being at the axis of the pivotal mounting of the base 15.

A cam plate guide 19 is secured to the cross feed plate 13 and the cam 20 is slidingly mounted in the guide 19. The cam is secured by a rod 21 on the tail stock 11 and thus held stationary. The cam has the cam surfaces with varying tapers 22 and 23 which conform to the taper of the tap being cut. A guiding finger 24 extends forward from the mounting 13ᵇ and engages the cam 20 following the surfaces 23 and 22. The mounting is drawn forward so as to maintain the finger in contact with the cam surfaces by a spring 25 which extends from a post 26 on the finger 24 to a post 27 on the guide plate 29.

In Fig. 4 I have shown diagrammatically the tap with its finished threads and the proper relation of these threads. As shown there are three types of cutting teeth on the tap, the tap shown being designed to cut chaser teeth which in turn are intended to cut a finished thread. One set of teeth 28 may be termed the finishing teeth, the set 29 which are along the throat of the chaser may be termed the starting teeth, and another set 30 which are extended further along the chaser the entrance teeth. The teeth 30 are made finer than the other teeth but of the same pitch. As formed there are two teeth 30 for each space in the distance between the crests of the other teeth. By laying out the distances 32 between the crests of the teeth on a line 31 parallel to the axis of the tap and extending the lines 33 from the points 32 inclined as the slopes of the finished teeth are inclined these lines 33 will extend into the tap in proper relation regardless of the taper and by forming the point of the cutting tool with an end having the taper properly inclined to the cutting face the slopes 34 and 35 of the teeth may be readily formed. Inasmuch as the mounting 13ᵇ slides on the line 33 and this sliding movement is controlled by the cam which corresponds to the tapers the threads cut by the tool will be true so far as pitch is concerned throughout the various tapers of the tap. Heretofore thread cutting tools for lathes have been set at an angle but so far as I am aware the taper attachment controlling the movement of a cutting tool for cutting threads to follow the taper has operated to give a right angle movement to the tool rather than an inclined movement and consequently did not correct variations incident to the taper of the tap.

In forming the chaser from this tap it is desirable to make the starting teeth 29 with an inclination of the slope 36 less abrupt than the other teeth in order that the die may be readily started on a bar or pipe. This is accomplished in this machine by swinging the cutting tool. The base 15 has a worm gear 37 arranged on its periphery meshing with a worm 38. The worm 38 is mounted on a shaft 39. The shaft 39 is journaled in bearings 40. Universals 41 with a connecting slip joint connect the shaft 39 with a shaft 43. The shaft 43 is mounted in bearings 44. A gear 45 is fixed on the shaft 43 and meshes with a drive gear 46 on the spindle 3. The universals comprise the stub ends 42$^a$ and 42$^b$ with a sliding sleeve 42 completing the slip joint and the sleeve 42 is moved off the stub 42$^a$ to disconnect the shaft 43 from the shaft 39 while the teeth in their normal form are cut. When it is desired to form the teeth 29 with the slopes 36 of the varying inclination the slip joint is connected by slipping the sleeve 42 over the stub end 42$^a$ and the tool is brought into the teeth 29 previously completed in their normal form and the lathe set in motion. The action of the worm on the base 15 swings the base and swings the tool. The point of the tool being at the axis of the base the point of the tool follows the trough of the thread thus cutting only the slope 36 with a gradually increasing inclination.

What I claim as new is:—

1. In a machine for forming screw thread cutting taps, the combination of a lathe spindle for driving a tap blank; a tool carriage; a tool holder slidingly mounted on the carriage with a line of movement inclined to the spindle axis as the slope of the tap teeth are inclined; a taper attachment conforming to the taper of the tap controlling the sliding movement of the holder; and means for feeding the tool.

2. In a machine for forming screw thread cutting taps, the combination of a lathe spindle for driving a tap blank; a tool carriage; a tool holder slidingly mounted on the carriage with a line of movement inclined to the spindle axis as the slope of the tap teeth are inclined; a taper attachment having a plurality of tapers conforming to the tap, the tapers of the tap controlling the sliding movement of the holder; and means for feeding the tool.

3. In a machine for forming screw thread cutting taps, the combination of a lathe spindle; a tool holder; a thread cutting tool in the holder; a pivotal mounting for the tool holder having an axis coincident with the cutting point of the thread cutting tool; means for feeding the tool forward and along a blank carried by the spindle; and means driven by the machine for swinging the mounting as the tool advances.

4. In a machine for cutting screw thread cutting taps, the combination of a lathe spindle; a tool holder; a thread cutting tool in the holder; a pivotal mounting for the holder having an axis coincident with the cutting point of the thread cutting tool; means for feeding the tool on an angle to the axis of the spindle corresponding to the inclination of the slopes of the thread to be cut on the tap; and means for feeding the tool forward and along the work.

5. In a machine for forming screw thread cutting taps, the combination of a lathe spindle; a tool holder; a thread cutting tool in the holder; a pivotal mounting for the tool holder having an axis coincident with the cutting point of the thread cutting tool; means for feeding the tool forward and along a blank carried by the spindle; and means driven by the machine for swinging the mounting as the tool advances, comprising a worm gear on the mounting, a worm meshing with the gear, and a connection between the worm and the machine.

6. In a machine for forming screw thread cutting taps, the combination of a lathe spindle; a tool carriage; a tool holder slidingly mounted on the carriage with a line of movement inclined to the spindle axis as the slope of the tap teeth are inclined; a taper attachment conforming to the taper of the tap controlling the sliding movement of the holder; a screw thread cutting tool mounted in the tool holder; a swinging mounting on the tool holder having its axis coincident with the point of the cutting tool; and means for feeding the tool forward and along the work.

7. In a machine for forming screw thread cutting taps, the combination of a lathe spindle; a tool carriage; a tool holder slidingly mounted on the carriage with a line of movement inclined to the spindle axis as the slope of the tap teeth are inclined; a taper attachment conforming to the taper of the tap controlling the sliding movement of the holder; a screw thread cutting tool mounted in the tool holder; a swinging mounting on the tool holder having its axis coincident with the point of the cutting tool; means for feeding the tool forward and along the work; and means driven by the machine for swinging the mounting as the carriage advances.

In testimony whereof I have hereunto set my hand.

JOHN D. MERRIFIELD.